May 6, 1952 B. M. MATHIAS 2,595,277
REVERSIBLE PLOW
Filed April 8, 1949 3 Sheets-Sheet 1

INVENTOR.
BERTON M. MATHIAS,
BY
McMorrow, Berman
and Davidson
ATTORNEYS.

May 6, 1952    B. M. MATHIAS    2,595,277
REVERSIBLE PLOW
Filed April 8, 1949    3 Sheets-Sheet 2

INVENTOR.
BERTON M. MATHIAS,
BY
McMorrow, Berman & Davidson
ATTORNEYS.

May 6, 1952     B. M. MATHIAS     2,595,277
REVERSIBLE PLOW

Filed April 8, 1949     3 Sheets-Sheet 3

INVENTOR.
BERTON M. MATHIAS,
BY
McMorrow, Berman & Davidson
ATTORNEYS.

Patented May 6, 1952

2,595,277

UNITED STATES PATENT OFFICE 2,595,277

REVERSIBLE PLOW

Berton M. Mathias, Monte Vista, Colo.

Application April 8, 1949, Serial No. 86,343

6 Claims. (Cl. 97—25)

1

This invention relates to reversible plows, and more particularly to a plow having two oppositely acting gangs of plow shares selectively movable to operative position to turn the plowed furrows in the same direction regardless of the direction of travel of the plow across a land area.

It is among the objects of the invention to provide an improved reversible plow having a wheel-supported frame and two gangs of respectively oppositely-acting plow shares mounted on the frame for selected movement to operative position, so that the plow can operate to turn all of its furrows in the same direction as it passes back and forth across a field or other land area, to thereby provide a plowed surface resistant to erosion and one which will retain the maximum amount of soil moisture, which plow includes means driven by the power take-off of a plow-towing tractor for moving the plow share gangs to and away from operative position, and lift means connected to the hydraulic system of such a tractor to lift the plow frame for interchanging the plow gangs, which includes means for holding the frame-supporting wheels in proper position corresponding to the land and furrow sides of the frame, and means for positively stopping the movement of the plow gangs relative to the frame when a selected plow gang has been brought to operative position, and which is strong and durable in construction, economical to manufacture, and easy to operate by means of power furnished by the associated tractor.

Other objects and advantages will become apparent from a consideration of the following description and the appended claims in conjunction with the accompanying drawings, wherein:

2

Figure 2:
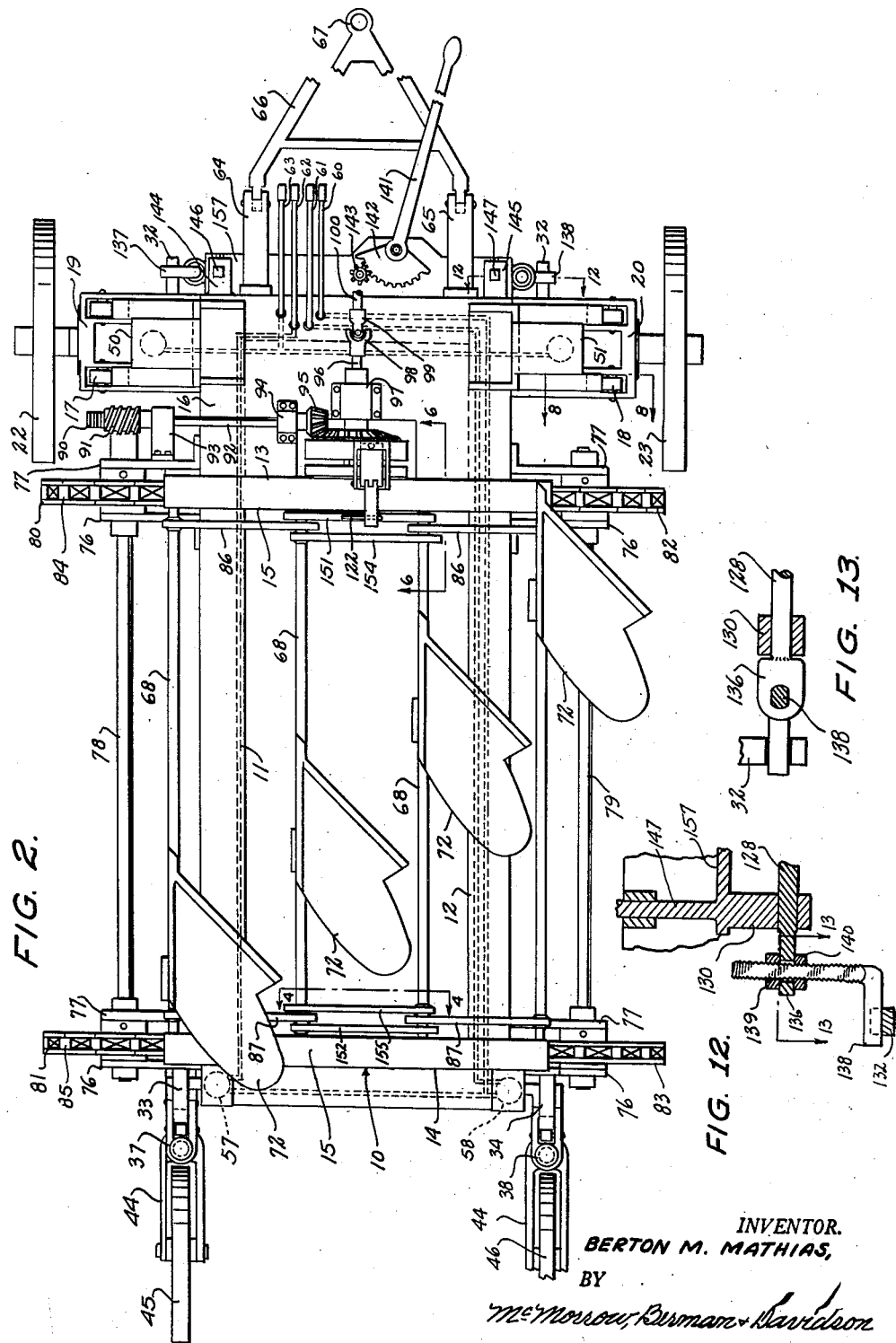
Figure 2 is a top plan view of the plow illustrated in Figure 1.
Figure 8:
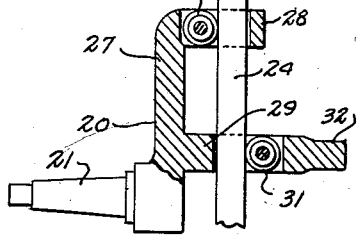

Figure 8 is a longitudinal cross-section of one of the wheel mountings of the plow and is taken on the line 8—8 of Figure 2;

Figure 9 is a face elevation of one element of the clutch component of the plow;

Figure 10 is a face elevation of a different clutch element;

Figure 11 is a diametrical cross-section of the clutch component;

Figure 12 is a cross-section of a fragmentary portion of the plow illustrating one of the wheel-position retaining cranks and is taken on the line 12—12 of Figure 2; and Figure 13 is a cross-section of the fragmentary portion of the plow illustrated in Figure 12, and is taken on the line 13—13 of Figure 12.

With continued reference to the drawings, the numeral 10 generally indicates an elongated, rectangular plow frame including a pair of longitudinally-extending, frame side members 11 and 12 connected together near corresponding ends by a front cross-member 13, and a rear cross-member 14. The two end members 13 and 14 extend above and below the frame side members 11 and 12 substantially equal distances and are provided along their upper and lower edges with respective flanges with the flanges of each end member directed toward the opposite end member.

Respective channel-shaped guide members 15 are secured to the flanges of the frame end members 13 and 14, and extend transversely of the frame above and below the frame side members 12. There are four of these channel-shaped guides, one of which is disposed above the frame near the front end of the latter, another of which is disposed above the frame near the rear end of the latter with its open side facing the open side of such one guide, another guide is disposed below the frame side members near the front end of the frame, and the fourth guide is disposed below the frame side members near the rear end of the frame, with its open side facing the open side of the guide disposed below and near the front end of the frame.

Figure 1:
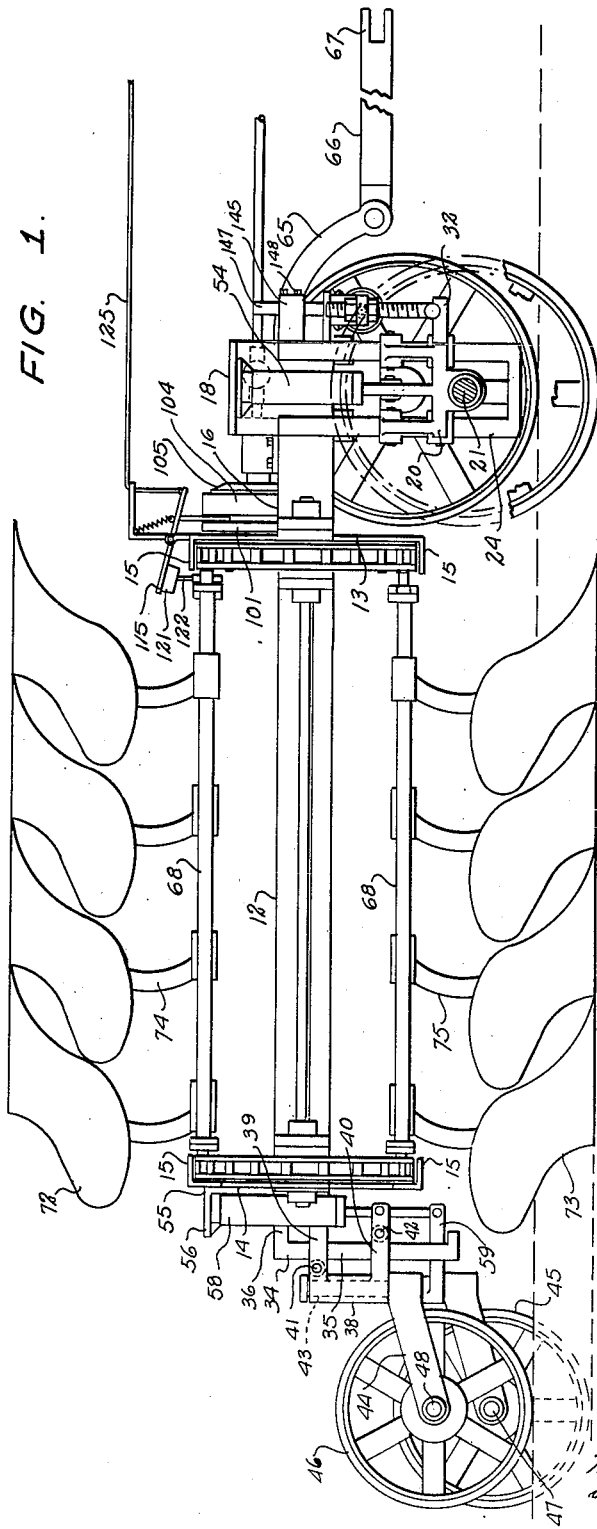
Figure 1 is a side elevation of a reversible plow illustrative of the invention.

A plate 16 overlies the upper edges of the frame side members between the front cross-member 13 and the front ends of the side members, and a pair of guide brackets 17 and 18 are secured respectively to the frame side members 11 and 12 at the outer sides, and at the front ends of these side members. The guide brackets 17 and 18 slidably receive respective vertically-disposed front-wheel-carrying brackets 19 and 20. Each of the brackets 19 and 20 has a front wheel axle extending outwardly therefrom, the axle extending outwardly from the bracket 20 being indicated at 21, and illustrated in Figures 1 and 8, and respective front wheels 22 and 23 are journaled on these brackets. The front wheels are non-steerable, but the frame is movable up-and-down relative to the front wheels, in a manner presently to be described.

Figure 3:
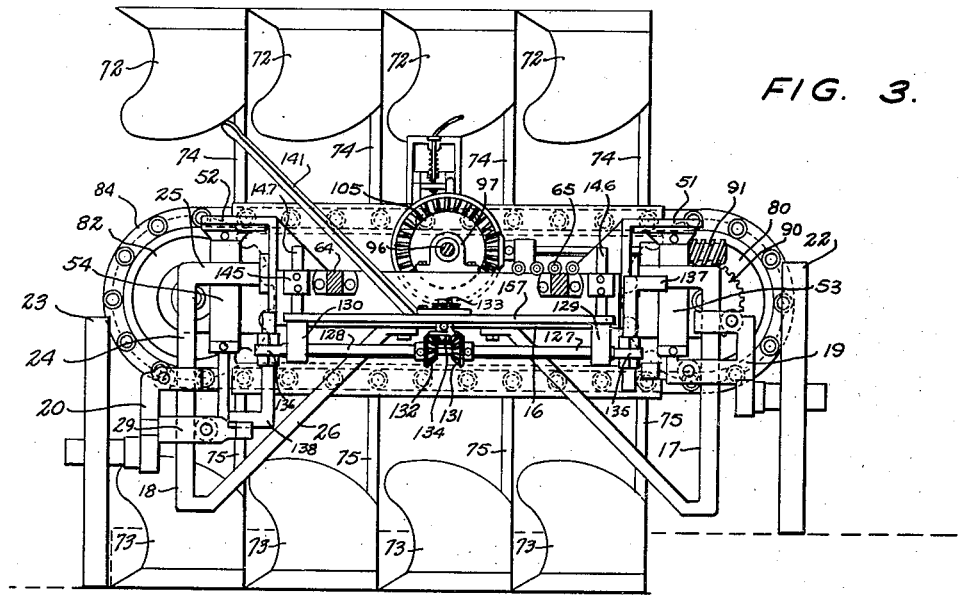
Figure 3 is a front-end elevation of the plow illustrated in Figures 1 and 2.

As particularly illustrated in Figure 3, each of the front-wheel-guide brackets 17 and 18 includes a pair of spaced-apart, substantially parallel-vertical guide rods 24 secured at their upper ends to the respective frame side members by perpendicularly-disposed, horizontal arms 25, and secured at their bottom ends to the underside of the plate 16 by diagonal braces 26. Each of the front-wheel-carrying brackets 19 and 20, as particularly illustrated in the case of the bracket 20 in Figure 8, includes a vertical portion 27 having at its upper end a perpendicularly-extending, horizontal portion 28 apertured to receive the vertical rods 24 of the corresponding guide bracket 18, and near its lower end a second perpendicularly-extending, horizontal portion 29 also apertured to receive the guide bracket portions 24, the axle 21 extending perpendicularly from the lower end of the vertical portion 27 in a direction opposite the horizontal arms 28 and 29. Rollers 30 and 31 are mounted in the arms 28 and 29 respectively to bear against the guide bracket rods 24 to facilitate vertical movement of the guide bracket rods through the apertured arms of the wheel-supporting bracket, and the lower arm 29 of the wheel-supporting bracket is extended inwardly of the corresponding guide bracket rods to provide a stop 32 for a purpose to be presently described.

Two guide brackets 33 and 34 extend rearwardly from the rear frame cross-member 14 and each includes a vertical guide rod 35 of square or other non-circular cross-sectional shape secured to the rear cross-member by a perpendicularly-extending, horizontal arm 36 at its upper end. Respective sleeves 37 and 38 are slidably mounted on the vertical arms 35 of the respective guide brackets 33 and 34 by means of spaced-apart, horizontal upper-and-lower arms 39 and 40 which are apertured to receive the guide bracket vertical arm 35, and provided with respective anti-friction rollers 41 and 42. A spindle 43 is journaled in each sleeve 37 and 38 and yoke arms 44 extend rearwardly from the bottom ends of these spindles to the respective rear wheels 45 and 46 which are received between corresponding yoke arms and journaled to the rear ends of the latter by respective axles 47 and 48. The rear wheels 45 and 46 are thus swivelly mounted at the rear end of the frame in the manner of caster wheels and will turn about the axes of the respective spindles 43 to permit the rear end of the frame to swing around when the plow is turned.

Respective angle brackets 50 and 51 are secured to the side frame members 11 and 12 at the outer sides and near the front ends of the latter, and include flanges 52 which are spaced above and overlie the respective front guide brackets 23 and 24. Respective hydraulic jacks 53 and 54 are vertically disposed between the respective angle bracket flanges 51 and 52, and the lower arms 29 of the respective front-wheel-carrying brackets 19 and 20, so that when hydraulic fluid under pressure is applied to these jacks, the front end of the frame will be raised relative to the front wheels upon which the front end of the frame is supported.

An elongated angle bracket 55 is secured to the rear frame cross-member 14 and has a flange 56 projecting rearwardly from the rear frame cross-member between the rear wheel guide brackets 33 and 34. Respective hydraulic jacks 57 and 58 are interposed between the flange 56 of the angle bracket 55 and a horizontal arm 59 projecting forwardly from the bottom end of each spindle 43, so that when hydraulic fluid under pressure is applied to the jacks 57 and 58 the rear end of the frame will be raised relative to the rear wheels 45 and 46.

Individual conduits 60, 61, 62 and 63 lead from the several hydraulic jacks to the front end of the plow where they are provided with fittings for connecting them to a suitable manually-operated valve, not illustrated, which is, in turn, hydraulically connected to the hydraulic system of the plow-towing tractor, so that the jacks may all be operated simultaneously for bodily lifting the frame relative to the four frame-supporting wheels, or either of the two rear jacks may be operated in either direction. These rear jacks are so dimensioned and arranged that one of them will support the frame from its corresponding wheel traveling in the plow furrow and the other will, at the same time, hold its corresponding rear wheel in elevated position substantially out of contact with the plowed ground at the rear of the plow.

Suitable lugs 64 and 65 project forwardly at spaced-apart locations from the front end of the frame, and a tongue 66 is pivotally connected at its rear end to these lugs, and is provided at its front end with an eye 67 for securing the tongue to a conventional tractor hitch.

A plurality of beams 68 extend longitudinally of the frame in spaced-apart, substantially parallel relationship to each other. These beams 68 are slidably received at their opposite ends in corresponding transverse guide members 15, and each beam has adjacent each end a reduced portion 69 and spaced-apart links 70 are provided with apertures receiving the reduced portions 69 at the opposite ends of the beams 68 to provide flexible means or link chains interconnecting the beams at corresponding ends. The links, at opposite sides of the beam interconnecting chains, are separated by spacers or rollers 71 which surround the reduced portions of the beams between the chain links at opposite sides of the chains.

The plow illustrated has two gangs of plow shares in which each gang includes four plow shares. In Figure 3, the plow shares of one gang are designated by the numeral 72, and the plow shares of the other gang are designated by numeral 73. In the arrangement illustrated, all of the plow shares 73 are right-hand plow shares, and all of the plow shares 72 are left-hand plow shares. With this arrangement, when the plow is drawn across a field or other land area in one direction, with the plow shares 73 in operative position below the plow frame, as illustrated in Figure 3, the furrows will be turned to the right in relationship to the direction of travel of the plow, and when the plow is turned and pulled across the area in the opposite direction, the plow shares 72 will be brought to operative position, turning the furrows to the left, so that all of the furrows will be turned in the same direction. This is of major importance, particularly in plowing sloping or terraced land, so that the presence of water furrows between lands plowed in the usual manner can be avoided.

Each plow share 72 is carried on a respective beam 68 by a corresponding shank 74. The plow shares are spaced outwardly from the corresponding beams by the shanks, as is clearly illustrated in Figures 1 and 3, and are arranged in consecutively rearward positions diagonally of the frame, as particularly illustrated in Figure 2, so that each successive plow share will turn its furrow into the furrow made by the preceding plow share.

The plow shares 73 are connected to respective beams 68 by respective shanks 75, and are arranged in the same manner as the plow shares 72. These plow shares may be either mold board or disc plows as may be desired, mold board plows only having been shown for simplicity in the drawings.

Respective bearing brackets 76 and 77 project laterally outward from each end of each frame cross-member 13 and 14, and sprocket shafts 78 and 79 are journaled in these bearing brackets at respectively opposite sides of the frame and outside of the frame side members 11 and 12. Two chain sprockets 80 and 81 are secured on the shaft 78, each sprocket being disposed between the two bearing brackets 76 and 77 of the corresponding pair of bearing brackets, and two similar sprockets 82 and 83 are secured on the shaft 79.

The chain 84 inter-connecting the front ends of the beams 68 and extending through the upper-and-lower, front guide brackets 15 passes over the two sprockets 80 and 82, and the chain 85 inter-connecting the beams 68 at their rear ends passes over the two sprockets 81 and 83.

With this arrangement, when the shafts 78 and 79 are rotated the beams 68 will be moved laterally of the frame to move one gang of plow shares to operative position beneath the frame, as indicated in the case of the plow shares 73 in Figure 3, and simultaneously move the other gang of plow shares to inoperative position above the frame, as indicated in the case of the plow shares 72 in Figure 3.

Figure 4:
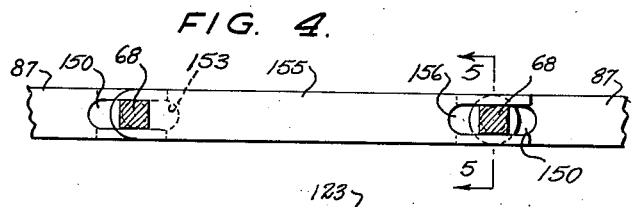
Figure 4 is a transverse cross-section of a fragmentary portion of the plow, and is taken on the line 4—4 of Figure 2.
Figure 5:
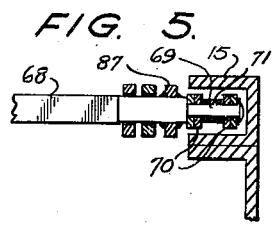
Figure 5 is a cross-section of a fragmentary portion of the plow and is taken on the line 5—5 of Figure 4.

In order to rigidly support the plow shares in their operative and inoperative positions against swinging or turning movements about the longitudinal center lines of the corresponding beams 68, arms are extended outwardly from each beam to engage an adjacent beam, as particularly illustrated in Figures 2 and 4. In the arrangement illustrated, there are four beams in each gang and two arms, 86 and 87, are secured to each outside beam near respectively opposite ends of the beams. Each arm is rigidly secured as by welding, at one end to the respective outside beam and extends outwardly at right angles to such outside beam to the adjacent intermediate beam. Each such arm is provided in its opposite end with an elongated notch 150, which receives the adjacent intermediate beam so that the two arms extending from each outside beam to the adjacent intermediate beam will maintain such outside beam against turning in the frame while permitting limited variations in the straight line distance between each outside beam and the adjacent intermediate beam. Two arms 151 and 152 are connected to one of the intermediate beams near respectively opposite ends of the latter and extend perpendicularly from such intermediate beam toward the other intermediate beam. Each of the arms 151 and 152 is welded at one end to the one intermediate beam and is provided in its opposite end with an elongated notch 153 receiving the other intermediate beam so that the one intermediate beam is held against turning in the frame. Two arms 154 and 155 are secured to the other intermediate beam near respectively opposite ends of the latter and extend perpendicularly from such other intermediate beam to the one intermediate beam mentioned above. Each of the arms 154 and 155 is welded, or otherwise rigidly secured at one end to the above-designated other intermediate beam and extends perpendicularly to the adjacent intermediate beam and is provided in its corresponding end with an elongated notch 156 receiving such adjacent intermediate beam. The two intermediate beams are thus also held against turning about their longitudinal center lines. The notches in the arms provide sufficient relative movement between the notched ends of the arms and the corresponding beams to permit the arm inter-connected beams to pass freely around the sprockets.

While the arm arrangement for the beams of only one plow gang has been described in detail, this arrangement is duplicated for the beams of the other gang.

One of the shafts 78 and 79, for example, the shaft 78, as illustrated, has, on its front end, a worm gear 90 which meshes with a worm 91 secured on the end of a shaft 92 which extends transversely of the frame ahead of and substantially parallel to the front end member 13. The shaft 92 is journaled in bearing blocks 93 and 94 respectively disposed near the opposite ends of the shaft, and a beveled gear 95 is secured on the end of the shaft opposite the worm 91 and near the mid-width location of the frame.

A shaft 96 extends longitudinally of the frame adjacent the beveled gear 95, and is journaled in a bearing block 97 mounted on the plate 16 at the front end of the frame. One element 98, of a universal joint connection is secured on the front end of shaft 96, which element 98 is secured to a cooperating element 99 from which an extension shaft 100 extends to the power take-off connection of the associated tractor.

Referring now to Figure 11, a trip-clutch element 101 is secured on the rear end of shaft 96 by suitable means, such as the nut 102, and keyed to the shaft for rotation therewith by a suitable key 103. A cooperating clutch element 104 is rotatably mounted on the shaft 96 between the clutch element 101 and the bearing block 97, and this cooperating clutch element 104 has thereon a beveled gear 105 which meshes with the beveled pinion 95 on the shaft 92. Means are provided for releasably interconnecting the clutch elements 101 and 104, such means comprising a bell crank lever 106 pivotally connected at its knee to the clutch element 101 by a pivot pin 107. A roller 108 is secured on the distal end of one leg of the bell crank lever 106, and the clutch element 104 is provided with an annular flange 109, the interior of which is provided with consecutively-arranged, rounded recesses 110 of substantially the same radius as the radius of the roller 108. The bell crank lever 106 is mounted on the face of the clutch element 101 adjacent the clutch element 104, and the roller 108 is positioned within the flange 109, as particularly illustrated in Figure 11, so that the roller engages in the recesses 110. When the roller is engaged in one of the recesses 110, torque is transmitted from the shaft 96 through the clutch element 101, the bell crank lever 106, the roller 108, and the clutch element 104 to the beveled gear 105.

A compression spring 111 resiliently urges the roller 108 into engagement in one of the pockets 110 in the clutch element 104 and the leg 112 of the bell crank lever 106, other than the leg upon which the roller 108 is mounted, projects outwardly of both clutch elements 101 and 104 for engagement by a trip lever to force the roller 108 out of a pocket in which it is engaged and thereby disconnect the clutch each time the shaft 96 makes a predetermined number of revolutions.

Figures 6, 7:
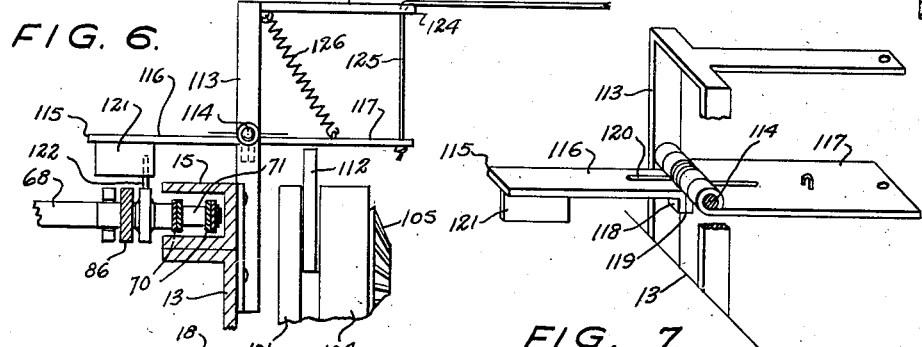
Figure 6 is a cross-section of a fragmentary portion of the plow and is taken on the line 6—6 of Figure 2.
Figure 7 is a perspective view of a manually-operated trip mechanism for a clutch component of the plow.

The trip mechanism for the clutch is particularly illustrated in Figures 6 and 7, and includes a rectangular bracket 113 secured to the front end member 13 of the frame, and projecting upwardly therefrom above the clutch. This frame has its legs disposed at opposite sides of the line of shaft 96, and a pivot pin 114 extends between these legs and carries the two-part trip lever 115. The two parts of the trip lever are provided, at their adjacent ends, with cylindrical eyes surrounding the pin 114, so that the two parts of the lever are hinged together by the hinge pin. At their interconnected ends the two lever parts 116 and 117 are provided with respective abutments 118 and 119 which cooperate as stops to limit relative movement of the two lever parts in one direction to a straight condition of the lever. A coiled torsion spring 120 surrounds the pin 114 and bears at its opposite end on the two lever parts 116 and 117 to resiliently hold the lever in a substantially straight condition.

The lever part 116 extends rearwardly from the frame end member 13 and is positioned above the beams 68 near the front ends of the beams. This lever part carries a depending contact plate 121 overlying the beams near their front ends, and the arm 151 of each gang is provided with a respective, inclined cam plate 122 which engages the bottom edge of the contact plate 121 when the corresponding plow gang has been brought exactly to its inoperative position, and the alternative plow gang has been brought exactly to its operative position. When a cam plate 122 engages the contact plate 121, the trip lever 115 is rocked about the pin 114, so that the lever part 117 is moved down into the path of the arm 112 of the bell crank clutch lever. When the arm 112 of the bell crank lever contacts the trip lever 115, the bell crank lever is rocked about the pivot pin 107, and the roller 108 is moved out of the pocket 110 in which it is engaged, thereby disengaging the clutch and discontinuing the drive from the shaft 96 to the sprocket shaft 78.

An elongated tongue 123 extends forwardly from the top of the bracket 113 and carries a sheave 124 near its forward end. A pull-cord 125 is connected at one end to the forward end of trip-lever part 117 and extends upwardly over the sheave 124 and thence forwardly to a location convenient to the driver of the plow-towing tractor. When the tractor and plow have been turned at the end of a passage across the field, or other land area, and it is desired to change the plow gangs, the operator pulls on the cord 125 which raises the part 117 of the trip lever out of the path of the arm of the bell crank lever, the trip lever bending about its hinge connection at the pin 114 against the force of spring 120.

After the bell crank arm 112 has been released, and the drive re-established between the shaft 96 and the sprocket shafts, the cam plate 122 will be moved out from under the contact plate 121 permitting the part 116 of the trip lever to descend, and the trip lever, as a whole, to regain its straight condition. If the pull-cord 125 is now released, the tension spring 126, connected between the top of bracket 113 and the part 117 of the trip lever, will hold the part 117 of the trip lever out of the path of the bell crank lever arm 112 until the cam plate 122 of the other plow gang comes to position to engage the contact plate 121. The movement of a plow gang from its operative position below the frame, to its inoperative position above the frame may require one or more revolutions of the clutch. As soon, however, as the plow gang has been completely moved to its inoperative position, the corresponding cam plate 122 will engage the contact plate 121 and move the trip lever against the force of spring 126, so that the part 117 of the trip lever is again placed in the path of the bell crank lever arm 112 to disengage the clutch and discontinue the plow-gang-moving drive.

Obviously, before a plow-gang can be moved from its operative position in which its plow shares are in the ground to the depth of the plowed furrow, the entire frame must be raised to bring these plow shares above the level of the ground. This is accomplished by the hydraulic jacks 53, 54, 57 and 58. These jacks, as explained above, are preferably manually controlled, so that the plow shares can be raised, when desired, and maintained in their raised condition, not only during changing of the plow gangs, but during the turning of the plow and tractor, and the plow shares can be lowered into the ground when it is desired to resume plowing.

As is well known to those skilled in the art, when the plow is traveling across the operational area, in one direction, one of the front wheels will be in the furrow left by the preceding passage, and the other front wheel will be upon unplowed land, one of the rear wheels will be above the plowed land, and the other rear wheel will be in the furrow left by the current passage. The rear wheel disposed in the furrow of the current passage will be at the opposite side of the plow frame from the front wheel disposed in the furrow of the preceding passage. When the direction of the plow is reversed, the other front wheel will be disposed in the furrow, and the front wheel which was previously disposed in the furrow will now ride upon the unplowed land, and the relationship of the rear wheels to the furrow will be similarly alternated. Suitable means, now to be described, are provided for supporting the plow frame from the front wheels at the alternating, different levels of the front wheels, as described above.

In the arrangement illustrated, this means includes two shafts 127 and 128 which extend transversely of the frame from the mid-length location of the frame to respectively-opposite sides of the latter. These shafts are journaled in respective bearing blocks 129 and 130 secured to the respectively-opposite ends of a transverse bar 157, the shafts being disposed below this bar 157 and ahead of the frame front cross-member 13. Respective beveled pinions 131 and 132 are secured on the inner ends of the shafts 127 and 128, and a stub shaft 133 extends through the bar 157 and carries on its lower end a beveled gear 134 meshing with the pinions 131 and 132. Each shaft 127 and 128 is provided, at its outer end, with a respective, internally screw-threaded eye, as indicated at 135 and 136, and respective cranks 137 and 138 are adjustably threaded through the eyes 135 and 136, the arrangement of the crank 136 being particularly illustrated in Figures 12 and 13. As illustrated in Figure 12, the screw-threaded leg of the right-angle crank extends through the aperture in the eye 136, and nuts 139 and 140 are threaded onto the stem of the crank respectively above and below the eye 136 to adjustably secure the crank to the shaft 128. A hand lever 141 is pivotally mounted at one end on the bar 157 and carries a gear sector 142, the teeth of which mesh with the teeth of a gear 143 secured on the upper end of the stub shaft 133 above the bar 157, so that the stub shaft 133 is rotated when the hand lever is swung about its pivotal connection with the frame from one side to the other. Such movement of the hand lever rotates the shafts 127 and 128 in opposite directions, turning the respective cranks 137 and 138 through 180-degrees to simultaneously lower one crank, and raise the other crank, the crank 138 being shown lowered, and the crank 137 raised in Figure 3. The crank which is lowered is positioned directly above the outwardly-extending abutment 32 of the corresponding front-wheel-supporting bracket 19 or 20. The hand lever 141 is moved while the frame is elevated by the hydraulic jacks 53 and 54, and when the frame is subsequently lowered, the crank which has been lowered by movement of the hand lever will bear upon the top of the corresponding abutment 32 and support the frame from the corresponding front wheel, that is, the front wheel which travels in the furrow. The frame is supported from the other higher front wheel by the bottom position of the corresponding hydraulic jack, the crank at that side of the frame being inoperative while in raised position.

Respective standards 146 and 147 extend upwardly from the bearing blocks 129 and 130 through respective collars 144 and 145 welded to the frame structure at the front end of the frame. These collars are adjustably secured to the standards 146 and 147 by suitable means, such as set screws 148, to hold the frame at various selected positions of adjustment relative to the bearing blocks 129 and 130 to thus regulate the height of the frame above the wheel axles, and consequently, the depth of the plowed furrows.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A reversible plow comprising an elongated frame, a pair of front wheels disposed at respectively opposite sides of said frame, a pair of rear wheels disposed at respectively opposite sides of said frame, a plurality of spaced-apart, substantially parallel beams extending longitudinally of said frame and laterally movable relative to the latter, plow shares carried one by each of said beams and arranged in two different gangs with the plow shares in one gang oppositely acting from the plow shares in the other gang, flexible means inter-connecting said beams at their opposite ends, sprockets journaled on said frame at respectively opposite sides of the latter and engaging said flexible means to move said beams laterally relative to said frame, gear means carried by said frame and connectible with a tractor power take-off for driving said sprockets, clutch means connected to said gear means for discontinuing the sprocket drive when either one of said plow share gangs has been moved to operative position beneath said frame, a manually-operated control for said clutch means, and manually-controlled means engageable between said frame and said front wheels for holding said wheels at respectively different distances from said frame corresponding to the plow gang disposed in engagement with the ground at the under side of the frame.

2. A reversible plow comprising an elongated, rectangular frame, a pair of front wheels disposed at respectively opposite sides of the frame near the front end of the latter, a pair of rear wheels disposed behind said frame, caster mounts connecting said rear wheels to said frame, a plurality of spaced-apart, substantially parallel beams extending longitudinally of said frame, a respective plow share carried by each beam, said plow shares being arranged in two alternatively usable gangs of oppositely-acting plow shares, flexible means interconnecting said beams at the opposite ends of the latter, guide means on said frame receiving said flexible means and the ends of said beams, some of said beams being disposed below and some above said frame, sprockets journaled on said frame and carrying said flexible means, tractor-driven means carried by said frame and drivingly connected to said sprockets to rotate said sprockets for moving said beams and said plow shares from one to the other of the top and bottom sides of said frame, a clutch in said tractor-driven means, means operated by said beams disengaging said clutch when said beams are in predetermined positions relative to said frame, manually-operated means effective to re-engage said clutch, manually-operated means interposed between said frame and said front wheels to maintain said frame a predetermined distance above the front wheel traveling in the plow furrow at any particular time, and hydraulically operated lift means connected between said frame and said wheels for lifting said frame to free said plow shares for movement to and away from their operative position below said frame.

3. A reversible plow comprising an elongated, rectangular frame, a pair of front wheels disposed at respectively opposite sides of the frame near the front end of the latter, a pair of rear wheels disposed behind said frame, caster mounts connecting said rear wheels to said frame, a plurality of spaced-apart, substantially parallel beams extending longitudinally of said frame, a plow share carried by each beam, said plow shares being arranged in two alternatively usable gangs of oppositely-acting plow shares, flexible means interconnecting said beams at the opposite ends of the latter, guide means on said frame receiving said flexible means and the ends of said beams, some of said beams being disposed below and some above said frame, sprockets journaled on said frame and carrying said flexible means, tractor-driven means carried by said frame and drivingly connected to said sprockets to rotate said sprockets for moving said beams and said plow shares from one to the other of the top and bottom sides of said frame, a clutch in said tractor-driven means, means operated by said beams disengaging said clutch when said beams are in predetermined positions relative to said frame, manually-operated means effective to re-engage said clutch, said tractor-driven means comprising a sprocket-carrying shaft journaled on said frame at one side of the latter, a worm gear on said sprocket-carrying shaft, a second shaft journaled on said frame and extending transversely of the latter, a worm on the outer end of said second shaft meshing with said worm gear, a beveled pinion on the inner end of said second shaft, a tractor-driven shaft journaled on said frame at the inner end of said second shaft and perpendicular to the latter, a first clutch element rotatably mounted on said tractor-driven shaft, a beveled gear on said first clutch element meshing with said beveled pinion, a second clutch element keyed on said tractor-driven shaft adjacent said first clutch element, clutch-carried means operative to drivingly connect said first and second clutch elements, and beam-carried means operative to release said clutch-carried means at predetermined positions of said beams relative to said frame.

4. A reversible plow comprising a wheel-supported frame, transverse guide means near the opposite ends of said frame disposed above and below the latter, a plurality of beams extending longitudinally of said frame in spaced-apart, substantially parallel relationship to each other with their opposite ends slidably engaged in said transverse guide means, said beams being arranged in two equal groups with one group disposed above and the other below said frame, sprockets, journaled on said frame at the opposite sides and near the opposite ends of the latter, flexible means inter-connecting said beams at their opposite ends and passing over said sprockets, tractor-powered drive means connected to said sprockets for moving said beams laterally of said frame to interchange the position of said groups of beams above and below said frame, a plow share carried by each beam, and means interconnecting said beams to restrain said beams against turning movements about their longitudinal axes comprising an arm rigidly secured at one end to each beam and extending perpendicularly therefrom to an adjacent beam and provided in its opposite end with an elongated notch receiving such adjacent beam.

5. A reversible plow comprising a wheel-supported frame, guide means disposed transversely of said frame near the opposite ends and above and below the latter, a plurality of beams extending longitudinally of said frame in spaced-apart, substantially parallel relationship with their ends slidably engaged in said guide means, flexible means inter-connecting said beams at their opposite ends, tractor-driven means carried by said frame and engaging said flexible means to move said beams laterally of said frame for alternatively positioning one group of beams below and another group above said frame, plow shares carried one by each beam, means carried by each beam and engageable with an adjacent beam to restrain said beams against turning about their longitudinal center lines relative to said frame, and hydraulic jacks connected between said wheels and said frame for lifting said frame to disengage the plow shares engaged in the ground and free said plow shares for movement relative to said frame.

6. A reversible plow comprising a wheel-supported frame, guide means disposed transversely of said frame near the opposite ends and above and below the latter, a plurality of beams extending longitudinally of said frame in spaced-apart, substantially parallel relationship with their ends slidably engaged in said guide means, flexible means inter-connecting said beams at their opposite ends, tractor-driven means carried by said frame and engaging said flexible means to move said beams laterally of said frame for alternatively positioning one group of beams below and another group above said frame, a plow share carried by each beam, and means carried by each beam and engageable with an adjacent beam to restrain said beams against turning about their longitudinal center lines relative to said frame, said means comprising a pair of arms secured to each beam one near each opposite end of the latter and extending substantially perpendicularly from such beam to engage an adjacent beam, each of such arms being rigidly secured at one end to one beam and having in its opposite end an elongated notch receiving a beam adjacent such one beam.

BERTON M. MATHIAS.

REFERENCES CITED

The following references are of record in the file of this patent:

UNITED STATES PATENTS

| Number | Name | Date |
|---|---|---|
| 220,367 | Foye | Oct. 7, 1879 |
| 748,623 | Kreuter | Jan. 5, 1904 |
| 1,529,042 | Teasley | Mar. 10, 1925 |
| 1,652,869 | McAuliff | Dec. 13, 1927 |
| 1,847,517 | Kopycinski | Mar. 1, 1932 |
| 2,101,837 | Blanchett | Dec. 14, 1937 |
| 2,128,273 | Stevens | Aug. 30, 1938 |
| 2,202,009 | Knox | May 28, 1940 |
| 2,310,930 | Blanchett | Feb. 16, 1943 |
| 2,314,041 | Gurries | Mar. 16, 1943 |

FOREIGN PATENTS

| Number | Country | Date |
|---|---|---|
| 730,175 | France | May 9, 1932 |
| 244,186 | Germany | Mar. 5, 1912 |